United States Patent [19]

Mulvey

[11] 4,245,801

[45] Jan. 20, 1981

[54] TAIL ROTOR CONTROL CABLE-PYLON FOLD ACCOMMODATION

[75] Inventor: William J. Mulvey, North Haven, Conn.

[73] Assignee: United Technologies Corporation, Hartford, Conn.

[21] Appl. No.: 12,548

[22] Filed: Feb. 15, 1979

[51] Int. Cl.$^2$ ............... B64C 27/04; B64C 27/50
[52] U.S. Cl. ............... 244/17.11; 74/89.22; 244/17.21; 244/49; 244/120
[58] Field of Search ............... 244/17.11, 17.17, 17.19, 244/17.21, 46, 49; 74/89.22

[56] References Cited

U.S. PATENT DOCUMENTS

| | | | |
|---|---|---|---|
| 3,116,896 | 1/1964 | Sigler et al. | 244/17.17 |
| 3,142,459 | 7/1964 | Baetke | 244/46 |
| 3,744,742 | 7/1973 | Gear | 244/17.11 |
| 3,901,464 | 8/1975 | Arnstein et al. | 244/46 |
| 3,921,938 | 11/1975 | Jupe et al. | 244/17.11 |

Primary Examiner—Charles E. Frankfort
Attorney, Agent, or Firm—Vernon F. Hauschild; Maurice B. Tasker

[57] ABSTRACT

A helicopter has main rotor blades foldable over its tail cone and a tail rotor pylon which is foldable about a tail cone vertical hinge from its fore-and-aft flight position through an angle approaching 180° to lie alongside the tail cone. Tail rotor pitch control mechanism includes a cable which extends across the foldable hinged members, direction change pulleys for the cable and an improved 4-bar linkage system which controls the movement of the pulleys within a small envelope circle and maintains a constant tension on the cable throughout the full fold cycle.

11 Claims, 11 Drawing Figures

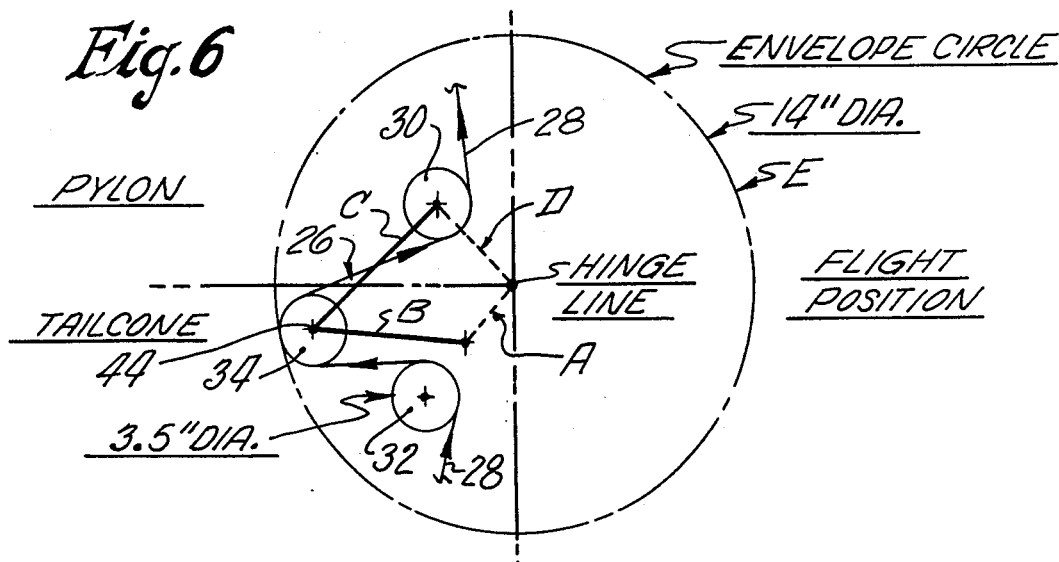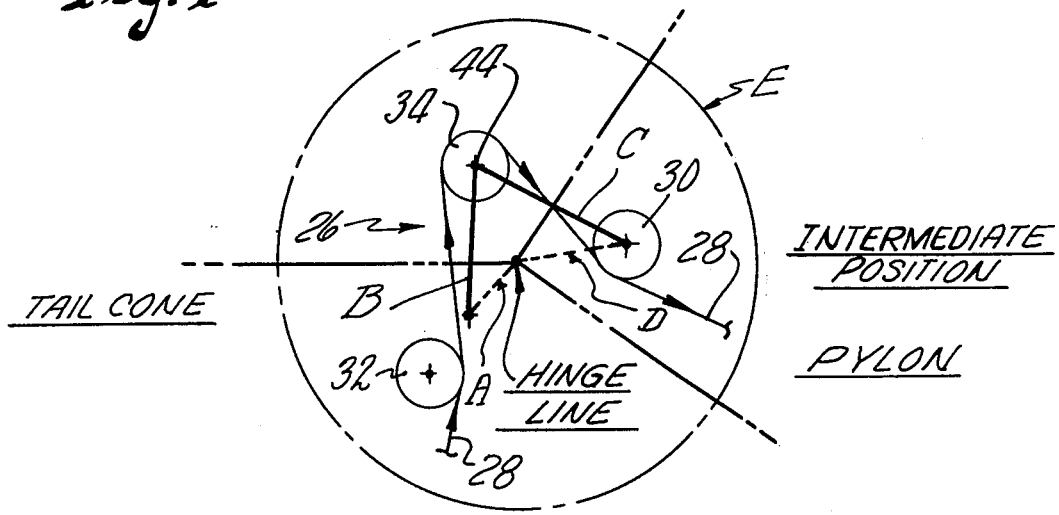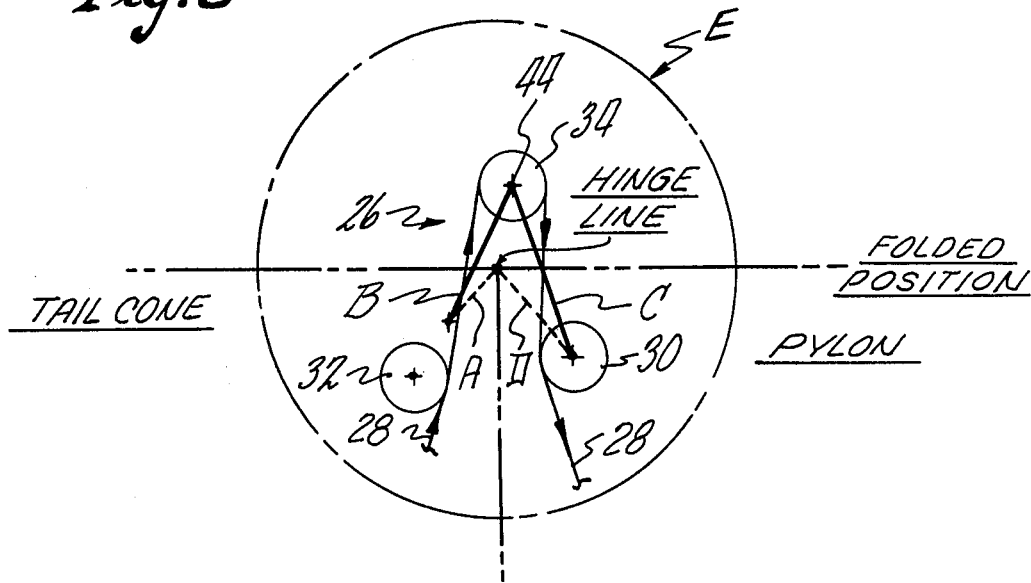

TAIL ROTOR CONTROL CABLE-PYLON FOLD ACCOMMODATION

The invention herein described was made in the course of or under a contract or a sub-contract thereunder, with the Department of the Navy.

BACKGROUND OF THE INVENTION

1. Field of Invention

This invention relates to helicopters which have their main rotor blades foldable over the tail cone and their tail rotor pylon foldable about a tail cone vertical hinge from a fore-and-aft flight position through an angle of approximately 180° into a position in which it lies alongside the tail cone so that the helicoter can be stored in a shipboard hangar or transported in the elevator of an aircraft carrier for storage beneath the deck.

More particularly this invention is concerned with the pilot operated pitch control cable for the tail rotor blades and a system of pulleys and links for maintaining a continuous cable with a substantially constant tension on this cable throughout the full fold cycle of operation of the tail rotor pylon.

2. Description of the Prior Art

U.S. Pat. No. 3,901,464, issued Aug. 26, 1975 to Bennett R. Arnstein et al shows in FIGS. 2 and 3 a system of pulleys and linkage for maintaining constant tension of a cable extending from the fuselage of an airplane to a spoiler on a variable sweep wing. Arnstein provides two links of equal length pivotally connected together at their free ends and having their other ends pivotally connected to fuselage 210 and wing 220 respectively by pivots spaced from hinge line 250 a distance equal to the length of the links, thus forming a parallelogram linkage. This linkage, however, requires that the floating pulley 34 mounted on the pivot common to both links be twice the diameter of pulleys 33,37 at the ends of the links which are pivoted on the fuselage and wing respectively. This structure is adequate for a swept wing where the angle of sweep is only about 45° and there is plenty of room for the linkage to operate. It is wholly inadequate for use with a helicopter tail rotor pylon which has a fold angle of approximately 180° and is located in the end of a tail cone which is 14" in diameter, as will be pointed out hereinafter.

SUMMARY OF THE INVENTION

It is an object of this invention to provide improvements in tail rotor pitch control systems for helicopters having foldable tail rotor pylons wherein control linkage disengagement is not required nor desired when it is necessary to fold the tail rotor pylon about a tail cone vertical hinge.

A further object is to provide control system linkage which does not require the use of control quadrants located on both the tail cone and the pylon which are conventionally used for accommodating tail pylon folding, together with tubular rods used between the quadrants.

A still further object of this invention is the provision of a 4-bar linkage and pulley system for a tail rotor pitch control cable capable of maintaining a continuous cable through the fold joint and a cable tension substantially constant through a 180° fold of the tail rotor pylon.

A yet further object of this invention is to provide such an improved 4-bar linkage which can operate in the very limited space available at the fold hinge line of a helicopter tail cone.

These and other objects and advantages of this invention will be obvious or will be pointed out in the following detailed description of the drawings.

BRIEF DESCRIPTION OF THE DRAWINGS

FIG. 6, 7 and 8 illustrate diagrammatically applicant's 4-bar linkage and pulley system, showing the system in the flight position of the pylon, a mid-position and the folded position. These figures also show the envelope circle within which the system can operate;

DESCRIPTION OF THE PREFERRED EMBODIMENT

Figure 1:
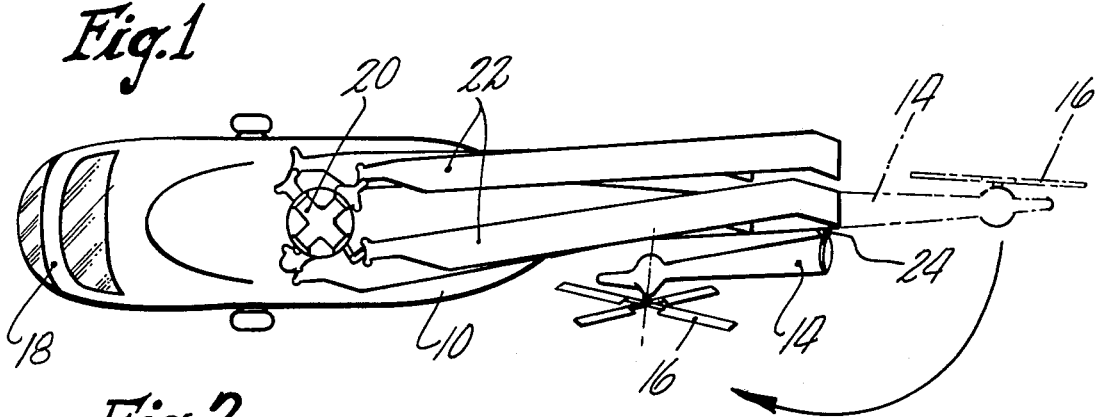
FIG. 1 is a plan view of the helicopter with its main rotor blades folded over its tail cone and its tail rotor pylon folded alongside the tail cone, the tail rotor pylon and tail rotor being shown in flight position in phantom lines.
Figure 2:
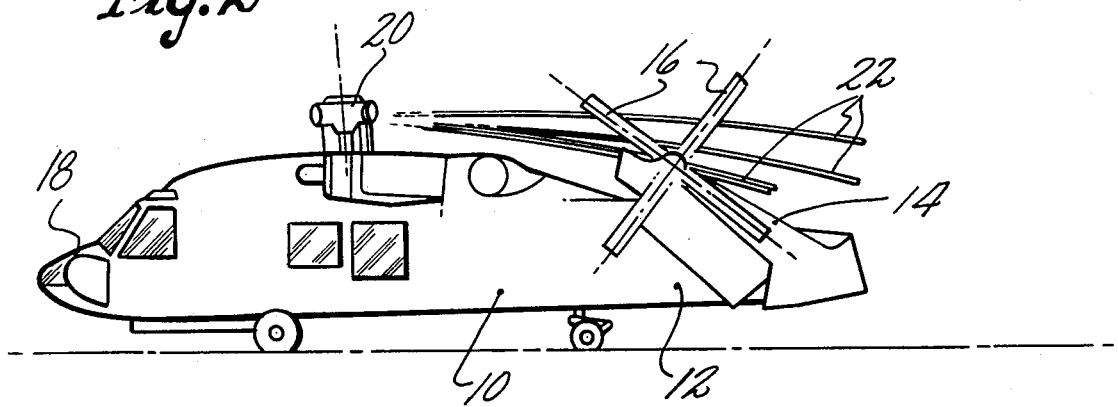
FIG. 2 is a side view of FIG. 1.

Referring first to FIGS. 1 and 2, a helicopter is shown having a fuselage 10 terminating in an aft tail cone 12 and tail rotor pylon 14 which supports the tail rotor 16. A usual pilot's compartment 18 is provided in the forward end of the fuselage. A main rotor head 20 has four blades 22 which are foldable back over the fuselage as shown in these figures. Tail rotor pylon 14 which is an extension of the tapered tail cone 12 is mounted on a vertical hinge pin 24 on the end of the tail cone for folding movement into a position in which it lies alongside tail cone 12 as shown in these figures. With blades 22 folded and tail rotor pylon 14 folded, as shown, the helicopter can be stored in a shipboard hangar or transported in a carrier elevator for storage below deck.

Figure 4:
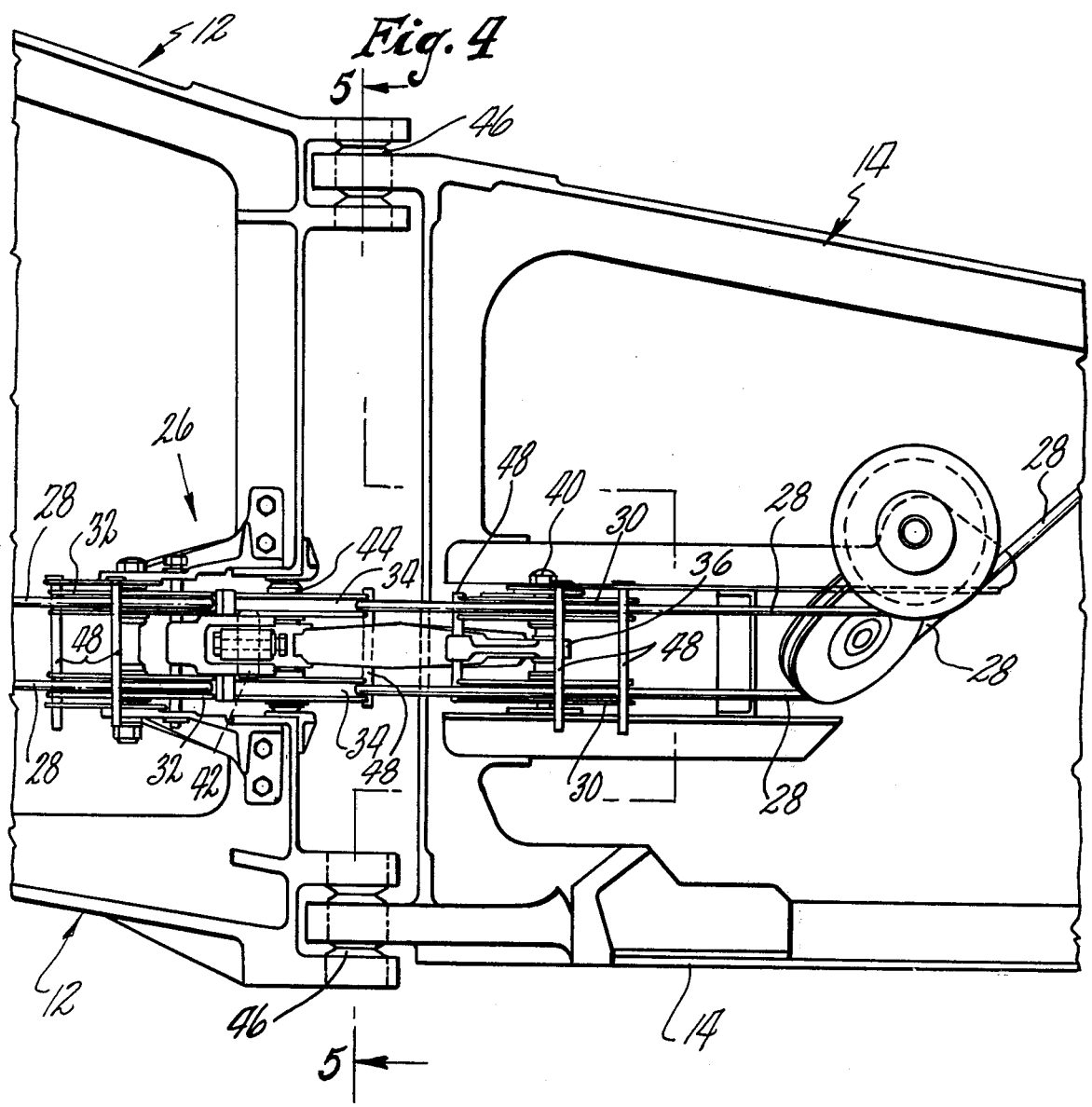
FIG. 4 is a side view of FIG. 3, partially in cross section.
Figure 5:
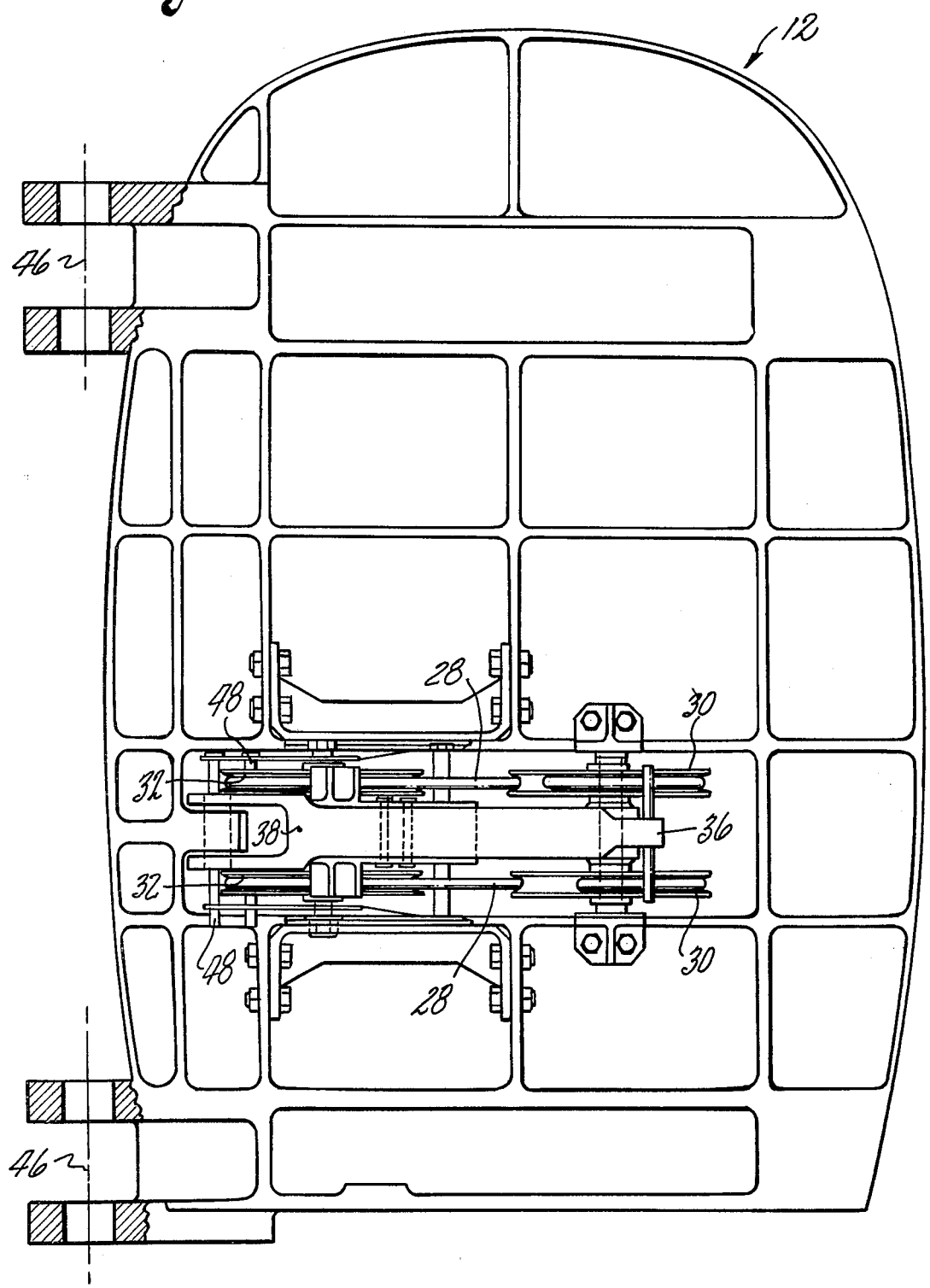
FIG. 5 is a vertical cross section through the pylon at the hinge line, substantially along line 5—5 of FIG. 4.

The blade pitch of tail rotor 16 is controlled by the pilot by means of cables and pulleys mounted in the tail cone and tail rotor pylon and in accordance with this invention an improved cable pulley and linkage mechanism 26 is provided at the junction between the tail cone and the tail rotor pylon for maintaining the cable at substantially constant tension during the folding and unfolding movements of the pylon. This mechanism is shown most clearly in FIGS. 3, 4, and 5. Here it should be noted that, , as shown particularly in FIG. 4 and 5, there are two cable and pulley mechanisms shown, one above the other, forming the two halves of the cable system. Since they are identical, only one will be described in detail. For this purpose, reference is made particularly to FIG. 3.

The improved cable control mechanism 26 for cable 28 consists of a pulley 30 fixed to pylon 14, a pulley 32 fixed to tail cone 12 and a free-floating pulley 34. All three pulleys 30, 32 and 34 are small and of the same diameter. Free-floating pulley 34 is supported by two links 36 and 38 of different length. The longer link 36 is pivoted on pylon 14 at 40 which is also the pivot for pulley 30. The shorter link 38 is pivoted at one end on the tail cone at 42. Links 36 and 38 have their free ends pivotally connected by pivot pin 44 which is also the pivot for floating pulley 34. Links 36 and 38 together with tail cone and pylon structure provide a 4bar linkage, indicated on the drawings in dash lines, forming a quadrilateral figure having sides A, B, C and D no two of which are parallel. Side A consists of the portion of the tail cone 12 between fold hinge line 46 and pin 42; side B consists of link 38; side C consists of link 36; and side D consists of the portion of tail rotor pylon 14 between pin 40 and fold hinge line 46. Side A is sometimes referred to as the "ground bar" since it is the part of the basic structure which does not move relative to the other bars. Here attention is particularly called to the fact that pulley 32 is not mounted on pin 42 at the end of link 38, but instead is critically located on a pin well spaced forward of pin 42 on tail cone 12. Also it should be noted that link 38 between pivots 42 and 44 is shorter than link 36 between pivots 40 and 44 and that side D of the quadrilateral figure is longer than side A.

Figure 3:
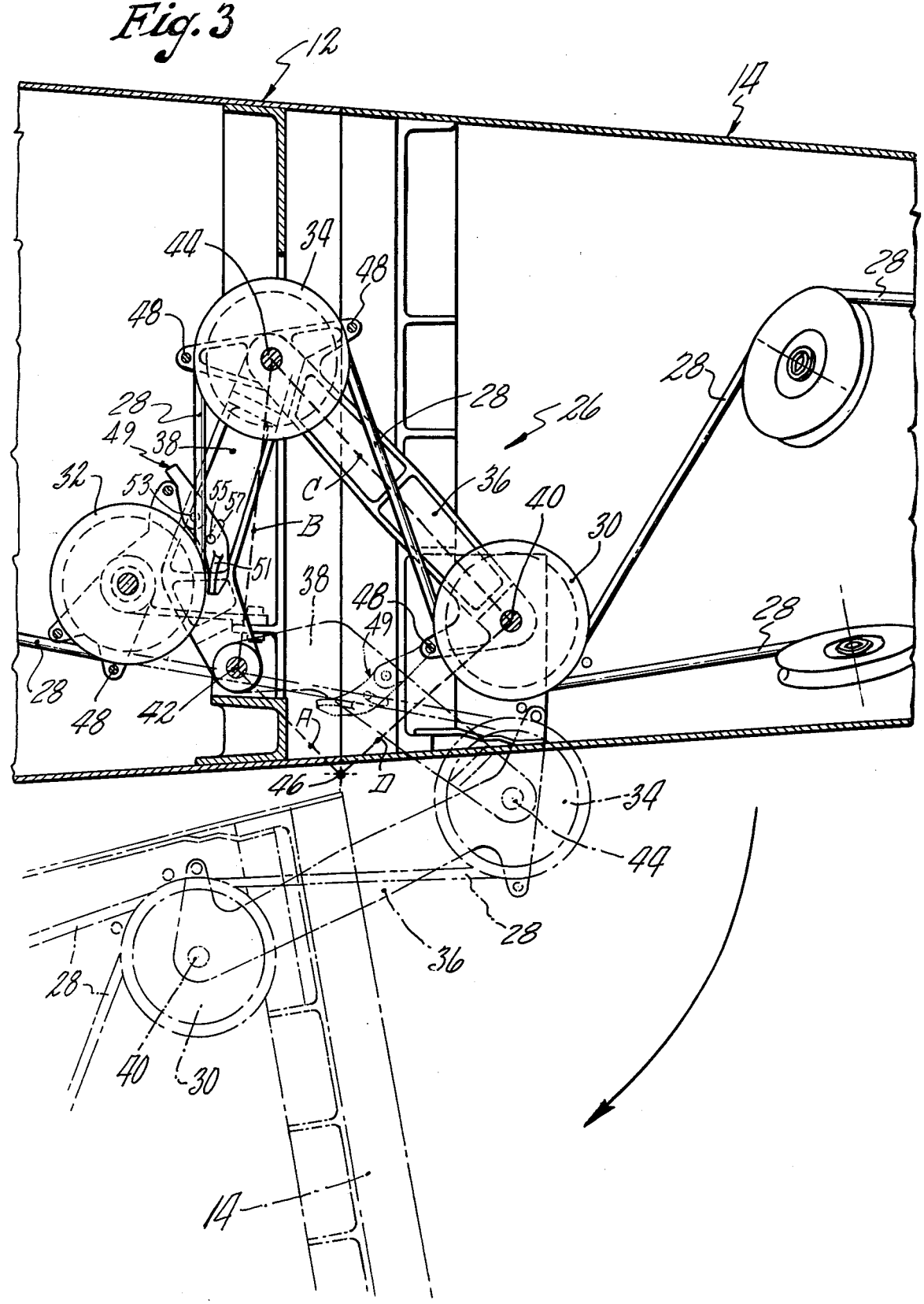
FIG. 3 is a somewhat diagrammatic plan view, partly in section, of the 4-bar linkage and pulley system for the tail rotor pitch control cable shown in flight position, the folded position of the system being shown in phantom lines.

At various locations adjacent pulleys 30, 32 and 34 it is necessary to provide cable restraint means to hold the cable in contact with the pulleys during installation and flight operation. Generally these restraints take the form of fixed pins 48 as illustrated in FIG. 3. Due to the extensive angular unwrapping of the cable from pulley 32 during the pylon folding operation, a fixed pin would have created detrimental cable bending, and thus it was necessary to install a pivotable restraint means 49 which is movable from its restraint position, shown in solid line in FIG. 3, when the pylon is in the extended mode to a non-interference position, shown in phantom line in FIG. 3, when the pylon is folded. Restraint member 49 having shoe 51 at one end is pivotally attached to link 38 by pin 53. Motion limiting pin 55, integral with member 49, operably engages arcuate slot 57 in link 38. Slot 57 allows member 49 to pivot on pin 53 during the folding cycle such that shoe 51 functions to restrain the cable in the unfolded pylon position, without adverse cable bending in the folded pylon position.

In FIGS. 6, 7 and 8 the operation of this improved system of linkage and pulleys is illustrated diagrammatically, the flight position of the parts being shown in FIG. 6, the folded position of the pylon being shown in FIG. 8 and an intermediate position being shown in FIG. 7. These figures also show the envelope circle E which is the smallest circle within which the mechanism can be used. It will be noted that FIG. 6 shows the position of links and pulleys which determines the size of the envelope circle. Aircraft specification requirements dictate that, for the size of cable used, the pulleys must be at least 3.5" in diameter. Also they specify that no portion of the reach of the cable between two pulleys shall contact more than one pulley during tail rotor blade pitch control operation. The tail cone at the hinge line measures 15" in diameter in the helicopter shown. By making all three pulleys 30, 32 and 34 3.5" in diameter, locating pulley 32 spaced well forward from pivot 42 and outside the quadrilateral figure, and making the sides A, B, C and D of different length a linkage and pulley system results which can operate within envelope E which has a diameter of about 14". It will further be noted that during the folding motion of the pylon, the 4-bar linkage system never approaches a position of equilibrium from which it cannot be moved by the pilot.

Figure 9:
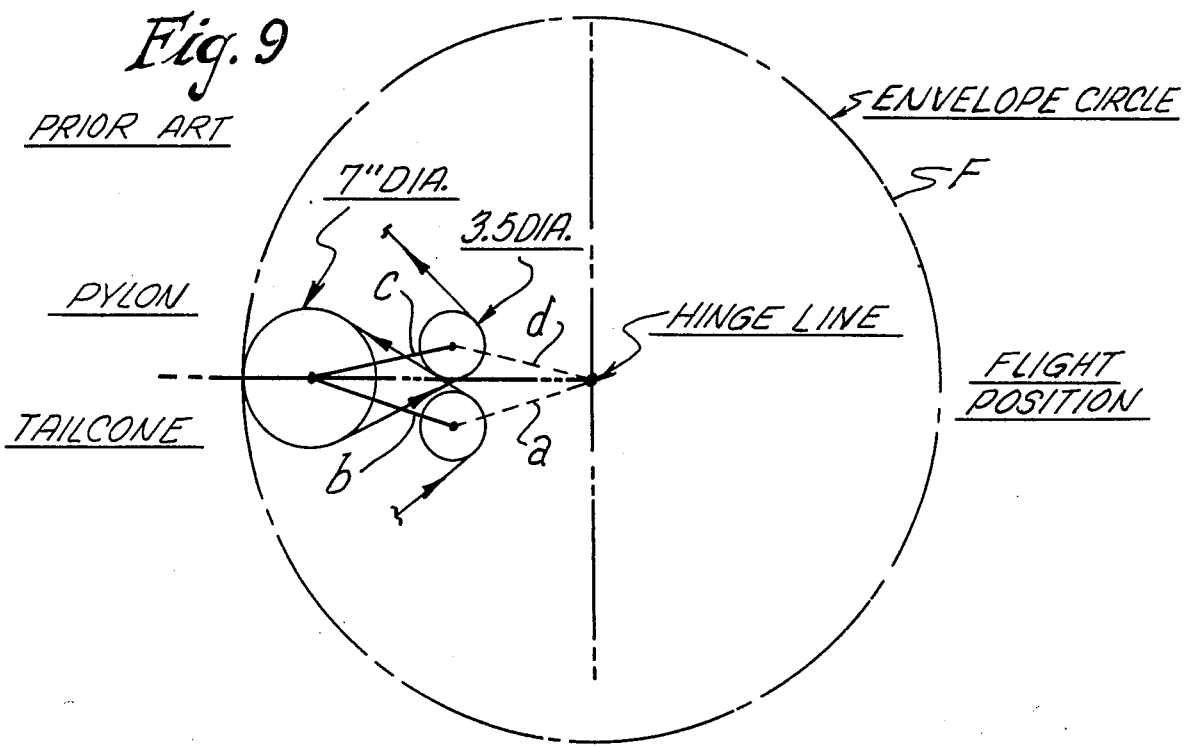
FIGS. 9, 10 and 11 illustrate diagrammatically, at the same scale, the 4-bar linkage and pulley system of the Arnstein U.S. Pat. No. 3,901,464, the envelope circle being shown in FIG. 9 for this system.
Figure 10:
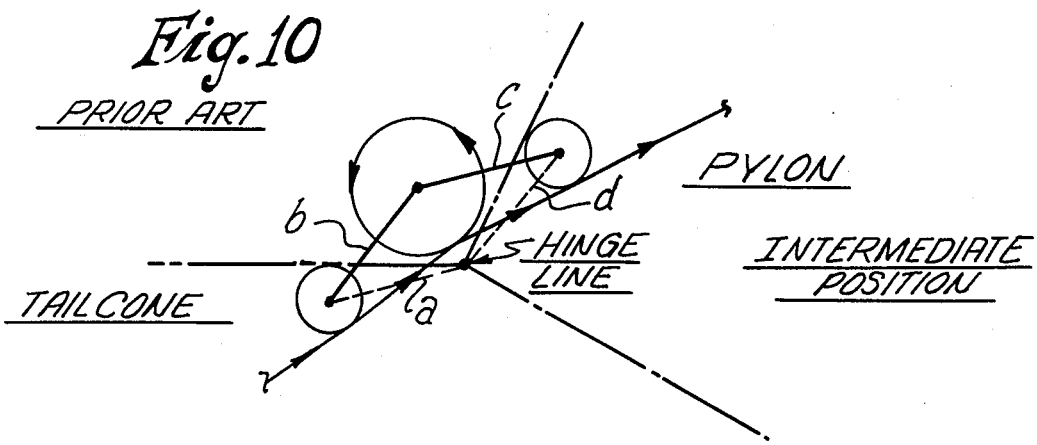
Figure 11:
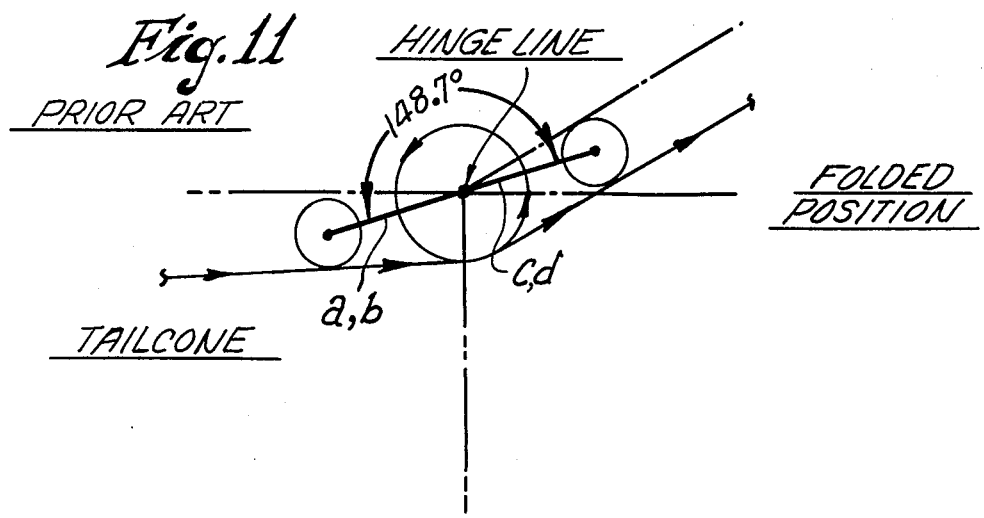

FIGS. 9, 10 and 11 which are drawn to the same scale as FIGS. 6, 7 and 8 demonstrate why the pulley and linkage system of the Arnstein U.S. Pat. No. 3,901,464 does not anticipate the invention claimed herein. Using 3.5" diameter pulleys, the smallest allowable, for his two smaller pulleys and 7" for his larger pulley, as he specifies, with his parallelogram linkage (shown in dash lines in FIGS. 9 and 10) and consisting of four equal length sides a, b, c, and d, his envelope circle is too big to allow the use of his linkage system for applicant's purposes. Moreover Arnstein's system is incapable of a fold angle of 180°, calculations indicating that his linkage system is capable of a fold angle of no more than 148.7° as shown in FIG. 11. Because of his parallelogram linkage even if he were able to fold 180° his pulleys, when the linkage is folded to the FIG. 11 position, would be aligned and an equilibrium would be established from which the system could not be returned to its original position by the pilot.

It is believed to be evident from the above description of a preferred form of his invention that applicant, as the result of using links of different length in combination with small pulleys all of one size and by locating pulley 32 fixed on tail cone 12 spaced forward from pivot 42, has produced a system for the first time which enables the tail rotor pylon of a helicopter to be folded through an angle of 180° while maintaining a substantially constant tension on the cable and to do this within an envelope circle of approximately 14" in diameter.

While one preferred embodiment of the invention has been shown and described in detail it will be understood that many changes in the construction may occur to persons skilled in this art which fall within the scope of the following claims.

I claim:

1. A helicopter having a fuselage terminating in an aft tail cone and a tail rotor pylon mounted on a generally vertical hinge pin at one side of said tail cone for folding the pylon from a flight position in which it forms an axial extension of said tail cone into a folded position in which it lies alongside said tail cone, a tail rotor on said pylon having variable pitch blades, a cable extended through said tail cone and pylon for controlling the pitch of said blades, a pulley and link system for maintaining said cable continuous and substantially constant tension on said cable during folding and unfolding movements of said tail rotor pylon, said pulley and link system including a first link pivoted at its first end on said tail cone at a point spaced forward from said hinge pin, a second link pivoted at its first end on said pylon at a point spaced aft of said hinge pin, said first and second links having their other ends connected by a common pivot, a first cable pulley mounted at the first pivoted end of said second link, a second cable pulley mounted on said common pivot, and a third cable pulley mounted on said tail cone on a pivot spaced forward from the first pivoted end of said first link.

2. The combination of claim 1 in which all three of the pulleys are of equal diameter.

3. The combination of claim 1 in which the first and second links together with the portion of the tail cone between the hinge pin and the pivot point for the first link on said tail cone and the portion of the pylon between the hinge pin and the pivot point for the second link on the pylon form a 4-bar linkage of which no two bars are of the same length.

4. The combination of claim 1 in which the pivot on the tail cone for the third pulley, the pivot on the tail cone for the first link and the hinge pin on the tail cone are all in substantial alignment.

5. The combination of claim 4 in which the pivot on the tail cone for the first link is substantially midway between the hinge pin and the pivot for the third pulley.

6. A helicopter having a tail cone, a tail rotor pylon hinged to said tail cone at its extremity and foldable from an aft flight position approximately 180° into a position alongside said tail cone, a cable extending from said tail cone into said pylon, and a pulley and linkage mechanism carried by said tail cone and pylon for maintaining said cable continuous and substantially constant tension on said cable during folding and unfolding movements of said pylon, said mechanism including a first link pivoted at one end to said tail cone, a second link pivoted at one end to said pylon, said links being of different length and having their other ends pivotally connected together, a floating pulley at the connected ends of said links, a pulley at the pivot for said second link on said pylon, and a third pulley pivotally mounted on said tail cone and spaced from the pivot point for said first link.

7. The combination of claim 6 in which the pulleys are all of the same diameter.

8. In a helicopter having a fuselage terminating in a tail cone, a tail rotor pylon mounted on a generally vertical hinge at one side of said tail cone adjacent its extremity and adapted to be folded approximately 180° from a flight position in which it forms an axial extension of said tail cone into a folded position in which it lies substantially parallel and alongside said tail cone, a tail rotor on said pylon having variable pitch blades, and a blade pitch control cable extending through said tail cone and said pylon, the combination of a pulley and linkage system for maintaining said cable continuous and substantially constant tension on said cable during the folding and unfolding of said pylon, said pulley and linkage system comprising a short link pivoted at one of its ends to the tail cone at a point spaced from said hinge, a second longer link pivoted at one of its ends on said pylon at a greater distance from said hinge than the spacing of said first link from said hinge, said first and second links having their other ends joined by a common pivot, a first pulley mounted at the pivot for said second link on said pylon, a floating pulley mounted on the common pivot for said links, and a third pulley mounted on said tail cone spaced from the pivot for said first link, the three pulleys having the same diameter and the 4-bar linkage formed by the first and second links and the connecting portions of the tail cone and pylon between the pivoted ends of these links thereon and the hinge forming a quadrilateral no two sides of which are parallel.

9. The combination of claim 8 in which the pivot for the third pulley on the tail cone lies outside the quadrilateral at all times during the folding movement of the tail rotor pylon.

10. The combination of claim 8 in which the distance between the floating pulley pivot and the pivot on the tail cone for the third pulley constantly changes during the folding and unfolding movements of the pylon.

11. The combination of claim 8 in which equilibrium of the linkage system never occurs during the folding operation of the tail rotor pylon.

* * * * *